UNITED STATES PATENT OFFICE.

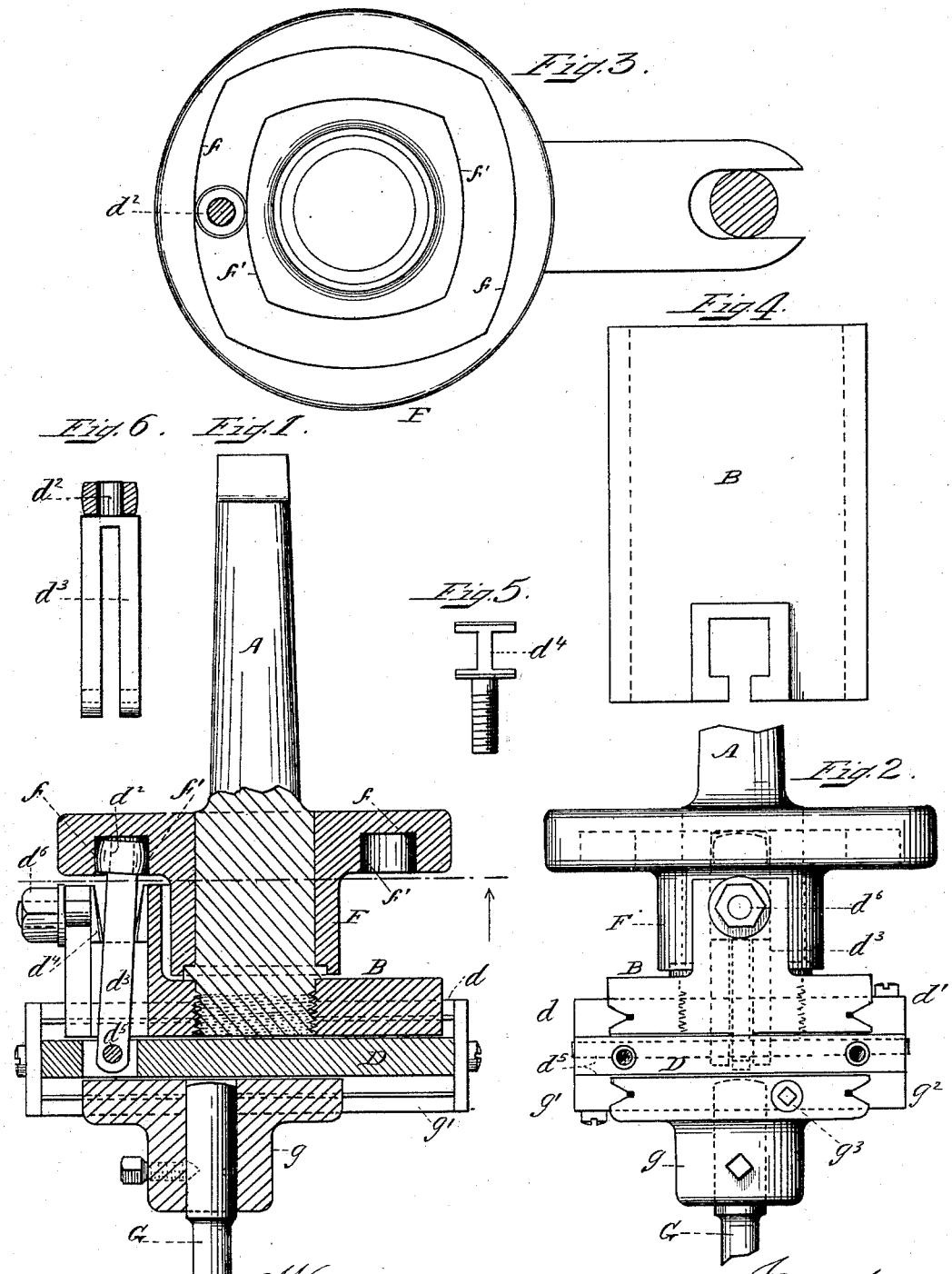

WILLIAM J. SMITH, OF BOSTON, MASSACHUSETTS, ASSIGNOR TO CHARLES S. LARRABEE, TRUSTEE, OF SAME PLACE.

MACHINE FOR BORING NON-CIRCULAR HOLES.

SPECIFICATION forming part of Letters Patent No. 485,233, dated November 1, 1892.

Application filed January 13, 1892. Serial No. 417,941. (No model.)

*To all whom it may concern:*

Be it known that I, WILLIAM JOHN SMITH, of Boston, in the county of Suffolk and State of Massachusetts, have invented an Improved Machine for Boring and Shaping, of which the following is a specification, reference being had to the accompanying drawings, in which—

Figure 1 is a sectional elevation of my improved machine. Fig. 2 is an elevation. Fig. 3 is an under plan of the guide. Fig. 4 is a plan of the block detached. Fig. 5 is a plan of the adjustable fulcrum detached. Fig. 6 is an elevation of the lever.

In my patent, No. 473,627, dated April 19, 1892, I describe my new machine for boring and shaping; and my present invention is an improvement on that, the improvement consisting, mainly, in moving the tool-carrier positively in both directions by the guide.

A second feature of my invention consists in connecting the tool-carrier and guide by a lever, whereby a single guide will answer for a variety of work by a simple adjustment of the lengths of the lever-arms.

As in my original machine, A is the tool-stock, B its block fast to and revolving with the stock A, and F the guide held from revolving with stock A, and the carrier D is connected by the ways $d\ d'$ with block B, and the tool-holder $g$ is connected by ways $g'\ g^2$ with carriage D.

In my former machine the stud $d^2$ was fast to carrier D, and the antifriction-roll on stud $d^2$ was controlled by the outer wall only of guide F, its motions toward the axis being positive from contact with the outer wall of guide F, while its motions in opposite directions were due to springs.

The first feature of my present invention is that stud $d^2$ is controlled positively in both directions, the guide F having two walls $f f'$, the outer wall $f$ moving stud $d^2$ positively toward the axis, as before, but the inner wall $f'$ moving stud $d^2$ away from the axis. This feature of my invention is obviously applicable to that form of my machine in which the stud $d^2$ is rigidly connected to carrier D; but in order to show both features of my invention I have shown stud $d^2$ as part of a lever $d^3$, whose fulcrum $d^4$ is carried by block B. The lever $d^3$ is connected by pin $d^5$ with carrier D.

The tool-holder $g$, in which tool G is made fast, is connected to carrier D by the ways $g'$ $g^2$, and the tool-holder $g$ is adjusted on carrier D by the screw $g^3$, as in my former machine. The fulcrum $d^4$ is adjustable on block B by means of the nut $d^6$, and by the adjustment of this fulcrum $d^4$ the throw of carrier is made more or less with a single guide F, as will be clear without further description.

The operation is as follows: The tool G must revolve with stock A when that stock is revolved in the usual drilling or boring machine, and it will revolve upon the axis of stock A; but as it revolves on the axis of stock A the stud $d^2$ is caused to travel between the walls $f f'$ of guide F, which is held from revolving, and thereby stud $d^2$ is moved toward and from the axis of stock A as stock A revolves, and this motion of stud $d^2$ moves lever $d^3$, which compels carrier D to move across the axis of stock A, carrying tool-holder $g$ with it, and thereby causing guide F to control the action of tool G.

What I claim as my invention is—

1. In a machine of the kind described, the guide having two walls, in combination with the tool-stock, the carrier moved positively both toward and from its axis of revolution by the guide, and the tool-holder carried by the carrier, all combined and operating substantially as described.

2. In combination, the tool-stock, the carrier, the tool-holder, the guide, and a lever connecting the carrier and guide, all substantially as described.

W. J. SMITH.

Witnesses:
J. E. MAYNADIER,
JOHN R. SNOW.